May 30, 1972     R. H. SNEDEKER ET AL     3,666,614

GLASS-POLYCARBONATE RESIN LAMINATES

Filed June 24, 1969

INVENTORS
ROBERT H. SNEDEKER
KENNETH T. GARTY
FRANK J. SKIERMONT

BY James J. O'Connell
ATTORNEY

United States Patent Office 3,666,614
Patented May 30, 1972

3,666,614
GLASS-POLYCARBONATE RESIN LAMINATES
Robert Howard Snedeker, Piscataway, Kenneth Thomas Garty, Somerville, and Frank Joseph Skiermont, Bound Brook, N.J., assignors to Union Carbide Corporation, New York, N.Y.
Filed June 24, 1969, Ser. No. 835,932
Int. Cl. B32b 17/10, 27/30; B60j 1/02
U.S. Cl. 161—183
19 Claims

ABSTRACT OF THE DISCLOSURE

A glass layer is bonded to a polycarbonate resin layer by using as an adhesive interlayer a composition which essentially consists of ethylene-vinyl acetate copolymer. Preferably, an organo-silicon compound is used as an adhesion promoting agent and is applied either as a primer on one or more of the lamina to be bonded to each other, or as an additive in the above-mentioned copolymer adhesive composition.

The laminated assemblies, produced as described above, may be used as structural windshields in motor vehicles.

BACKGROUND OF THE INVENTION

(1) Field of the invention

The invention relates to the field of glass-polycarbonate resin laminates.

(2) Description of the prior art

Structural laminates made of glass and thermoplastic resins have been used for a number of applications. The use of such laminates, however, has been curtailed due to deficiencies inherent in the laminates available to date. Where the laminates have been intended for outdoor utility, such as street light globes or coverings, outdoor telephone booths or automobile windshields, the laminate systems available to date have not provided the broad spectrum of properties which are required for such applications, such as weather resistance, optical clarity and the absence of color, high temperature strength and low temperature resilience. Because of the difficulty of bonding glass to other materials, it has also not been possible to provide, in many cases, glass-resin laminates wherein the laminae will not delaminate under the required use conditions. Furthermore, the adhesives employed, or the procedures involved in using the adhesives, sometimes produced opaque laminate systems which were not suitable for applications which required the use of a transparent or even a translucent laminate. Essentially because of the physical properties of glass, moreover, it has not been readily possible to date, to provide a structural element, such as a windshield for an automobile or other motor vehicle, from a glass-resin laminate system which would have the load bearing properties which would enable such windshield to be used as a load-bearing member in the construction and design of the automobile or other motor vehicle.

Although polycarbonate resins have been proposed for use in the preparation of glass-resin laminates for motor vehicle windshield and outdoor applications because of their various physical properties, the adhesives that have been proposed for use in such laminates have generally not proven satisfactory, in that they do not provide the desired degree of adhesion under the desired use conditions, nor do they allow for the desired degree of clarity and transparency.

SUMMARY OF THE INVENTION

Structural elements are made of laminates of glass and polycarbonate resin. The laminates are prepared with an adhesive which is a copolymer of ethylene and vinyl acetate.

An object of the invention is to provide a structural load-bearing laminate which comprises glass and polycarbonate resin.

Another object of the present invention is to provide an automobile windshield made of glass and polycarbonate resin which will function as a structural load-bearing member.

A further object of the present invention is to provide a process for laminating glass to polycarbonate resin.

A still further object of the present invention is to provide a motor vehicle which will have a glass-polycarbonate resin laminate windshield functioning as a structural element to support the roof of the vehicle.

A still further object of the present invention is to provide an abrasion resistant laminate which contains glass and polycarbonate resin and which can be used as a laceration proof window.

DESCRIPTION OF THE PREFERRED EMBODIMENT

It has been found that laminates which have excellent physical properties, and which are greatly resistant to delamination, and which may be used as structural support members, may be readily formed by adhesively laminating glass and polycarbonate resin with an adhesive which is a copolymer of ethylene and vinyl acetate. The adhesion of the laminae to each other may also be enhanced by the use of organo-silicon adhesion promoters.

THE LAMINATE PRODUCTS

Figure 1:
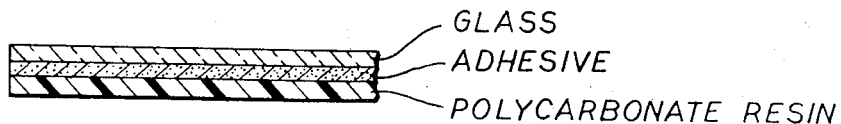
FIG. 1 is a side view of a one-ply glass/one-ply polycarbonate resin laminate of the present invention.
Figure 2:
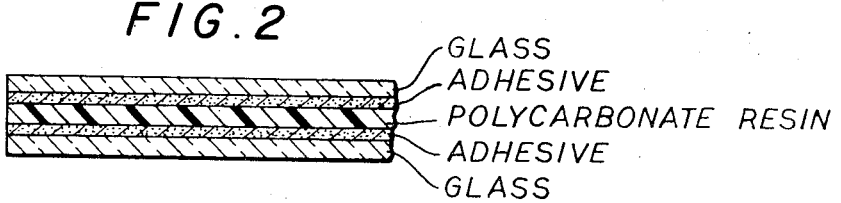
FIG. 2 is a side view of a laminate of the present invention which contains a core of polycarbonate resin and two outer layers of glass.
Figure 3:
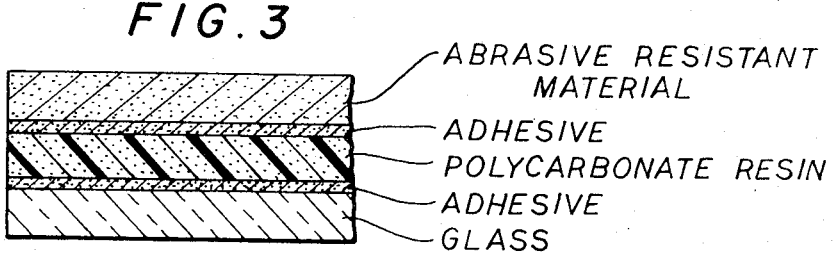
FIG. 3 is a side view of a multi-ply abrasion resistant laminate of the present invention.
Figure 4A:
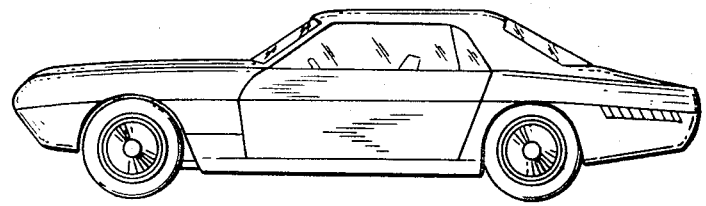
FIGS. 4a and 4b are side and front views of an automobile with a windshield as a structural support member made from a laminate of the present invention as shown in FIG. 2.
Figure 4B:
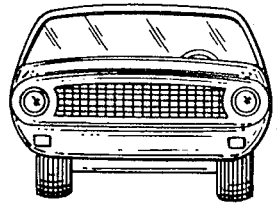

Laminate products of the present invention are illustrated in the drawings. In FIG. 1, for example, there is shown a laminate of one-ply or lamina of glass and one-ply or lamina of polycarbonate resin bonded together by an ethylene-vinyl acetate copolymer. In FIG. 2 there is shown another type of laminate which consists of two laminae of glass bonded to a core of polycarbonate resin by two laminae of ethylene-vinyl acetate copolymer adhesive. FIG. 3 shows a multi-ply laminate of the present invention which also contains an abrasion resistant lamina. FIGS. 4a and 4b illustrate a preferred embodiment or use of the laminates of the present invention in the form of an automobile windshield which is used as a structural support member to substantially support the roof of an automobile. The use of such structural support member obviates the need for so-called A posts commonly employed to support the roof of a conventional automobile. The removal of the A posts increases the driver's visibility by at least about 15 percent. Such a structural support member may also be used to supplement the load bearing function of the A posts.

When used as a structural motor vehicle windshield, the laminates of the present invention may function in a load-bearing manner not only to support the roof during normal operation of the motor vehicle but also when the automobile rolls over as a result of an accident. Under such circumstances, although the glass components of the laminate may break, they will remain intimately bonded to the polycarbonate resin whose rigidity is sufficient to retain a very high level of load bearing strength within the overall system and thus support the body of the car in the inverted position. Because of the impact strength of the laminate system, the structural windshield is also rendered virtually impenetrable by occupants of the car and thus provides engineered resistance to "pop-out" upon impact which precludes the ejection of occupants during a crash, at least through the windshield. This is a prime concern to safety engineers since it has been shown that containment within the vehicle markedly increases the prospects of survival during an accident. Impenetrability also prevents the progressive facial lacerations that accompany the forward and downward thrust of a passenger striking a windshield during frontal impact.

The nature of a structural windshield made with a laminate of the present invention insures against the generation of shards and flying glass during impact. When the laminates of the present invention are made with glass that is tempered by thermal or chemical treatment, other advantages arise upon breakage of the glass by reason of the fact that the tempered glass fractures with a dull edge which will tend to minimize cosmetic injuries. Because of the flexible nature of the tempered glass skins, moreover, the structural windshield will yield somewhat upon impact and thus provide a minimized shock effect to the cranial regions of occupants of the car who might strike such windshields.

In addition to load-bearing and safety characteristics, the laminates of the present invention also have excellent weatherability properties and are completely transparent and clear colorwise. The laminates do not delaminate under extremes of pressure or temperature.

LAMINATION PROCESS

In preparing the laminates of the present invention a layer of ethylene-vinyl acetate copolymer adhesive is applied between each layer of glass and polycarbonate resin that is to be bonded together and the resulting laminae, after being laid-up one upon the other, are bonded together under elevated temperature and pressure conditions. The bonding is preferably conducted at a temperature of about 80 to 205° C., and most preferably at about 110 to 140° C., and at a pressure of about 2 to 300 pounds per square inch (p.s.i.), and most preferably at a pressure of about 150 to 250 p.s.i.

The bonding operation may be conducted in any of the commonly employed autoclaves or similar pressurized devices which have been used by those in the art for preparing glass-thermoplastic resin laminates, such as, autoclaves or hydraulic presses.

The surfaces of the laminae may be chemically treated in order to improve the adhesion of the laminae to each other. Treatments which may be made on the surface of the glass in this regard include etching with chemicals such as strong acids, bases and salts; and by painting, spraying, dipping or otherwise applying organo-silicon compounds.

The surface of the polycarbonate resin may be treated chemically with materials such as acids, bases, oxidizing agents, reducing agents as well as by painting, spraying, dipping or otherwise applying thereto, organo-silicon compounds.

The surfaces of the polycarbonate resin may also be treated mechanically by sanding or other mechanical procedures such as embossing.

The surface of the adhesive lamina may also be treated with chemicals such as reducing agents, oxidizing agents and/or organo-silicon compounds; and/or mechanically embossed or striated to improve the adhesion properties thereof.

The surfaces of the abrasion resistant laminae may be treated in the same manner as the surfaces of the polycarbonate resin or adhesive lamina.

The preferred mechanism for increasing the adhesion of the laminae to each other is to employ organo-silicon compounds as adhesion promoters. These organo-silicon compounds may be applied directly to the surface of any one or more of the laminae, or the adhesion promoter compound may be effectively incorporated or admixed into the adhesive before the latter is applied between the other laminae. One or more of such adhesive promoters may be used.

Where the laminate product is to have a non-planar structure or configuration, the non-planar configuration is preferably applied separately to the respective laminae before the laminae are laid up in the laminating equipment. The sizes of the laminates which may be prepared by the present invention are only limited by the size of the pressing or autoclave equipment which might be constructed to prepare such laminates. There are no apparent limitations on the thickness or size of the laminates as well as on the number of plies of glass and/or polycarbonate resin that may be employed in preparing such laminates.

In applying the ethylene-vinyl acetate copolymer adhesive between the laminae, it is preferable to use the adhesive in the form of solid sheets which are the order of about 0.0005 to 0.5 inch thick. The adhesive may, of course, also be applied in the form of a solution or by other procedures commonly employed by those in the art. The methods of applying the adhesive thus includes the application of a solution of the copolymer to the glass and/or to the other laminae surfaces and evaporating the solvent, whereby a thin coating of copolymer i.e., about 0.0005 to 0.50 inch, is provided on the laminae surfaces; or by melting the copolymer while it is in contact with the laminae as by the use of heat and pressure, fluidized beds and the like. The adhesive should be applied so that it provides continuous contact with the laminae surfaces that are to be bonded.

THE GLASS FOR THE LAMINATES

The glass which is to be employed in the laminates of the present invention encompasses all types of glass that have been commonly used in the preparation of glass laminates. Thus, the glass might be common plate glass, thermally tempered glass, chemically tempered glass, or other appropriate types. An example of the chemically tempered glass is that which has been treated chemically with salts in an ion-exchange type process to give a higher tensile and flexural strength glass. A glass treating process of this type is disclosed in U.S. 3,395,998. Tempered glasses are available commercially and are marketed by such companies, as Pittsburgh Plate Glass Company of Pittsburgh, Pa. (thermal tempered glass) and Corning Glass Works, of Elmira, N.Y. (chemically tempered glass).

The laminae of glass are prepared from sheets that have thicknesses of the order of about 0.025 to 0.30 inch, and preferably about 0.05 to 0.10 inch. For automobile windshield applications, the glass laminae are each preferably about 0.05 to 0.50 inch thick.

The glass may be transparent, translucent, opaque, and/or tinted, as the application may require. The glass may also contain or have on its surface salts and/or metal oxides that will respond to or conduct an electric current and thus allow such glass to be heated by electric current.

POLYCARBONATE RESINS FOR THE LAMINATES

The polycarbonate resins which may be employed in the present invention are those solid polymeric resins which contain in their polymeric chain, a plurality of carbonyl dioxy or carbonate groups, i.e.,

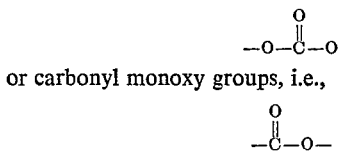

or carbonyl monoxy groups, i.e.,

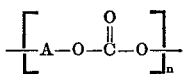

linked by divalent carbon atom containing radicals.

The polycarbonate resins which may be employed in the present invention thus include homopolymers which have the general formula I 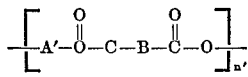

wherein $n$ is a whole number representing the number of recurring units and it is $>1$, A is a divalent organic radical in which the terminal atoms are carbon atoms, and copolymers which have the general formulae IIA 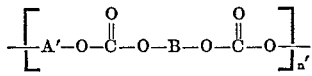

and

IIB wherein, in each of IIA and IIB $n'$ is a whole number representing the number of recurring units which is $>1$, A' and B are different divalent organic radicals in which the terminal atoms are carbon or nitrogen atoms in IIA and carbon atoms in IIB. A, A' and B may be aliphatic or aromatic in nature. These radicals are devoid of substituent groups which would interfere with the preparation of the resins, that is, groups that would be reactive in the systems employed in such preparations.

Examples of such radicals are substituted and unsubstituted alkylene and alkylidene radicals such as methylene, ethylene, propylene, propylidene, isopropylidene, butylene, butylidene, isobutylidene, amylene, isoamylene, amylidene, isoamylidene, and the like; two or more substituted or unsubstituted alkylene or alkylidene groups connected by a non-alkylene or non-alkylidene group such as an aromatic linkage, a tertiary amino linkage, an ether linkage, a carbonyl linkage, or by a sulfur-containing linkage such as sulfide, sulfoxide, sulfone, and the like; a substituted or unsubstituted alkylene, alkylidene or cycloaliphatic group containing ethylenic unsaturation; a substituted or unsubstituted aromatic radical such as phenylene, naphthalene, biphenylene; two or more substituted or unsubstituted aromatic groups connected through non-aromatic linkages; or a substituted or unsubstituted aralkyl radical such as tolylene, xylylene and the like. Preferably, the unsubstituted radicals contain from 2 to 10 carbon atoms.

The preferred aliphatic organic radicals are the cycloalkylene radicals, and notably the tetraalkyl cycloalkylene radicals. The most preferred of such aliphatic radicals are the tetraalkyl-1,3-cyclobutylene radicals, such as 2,2,4,4-tetramethylcyclobutylene-1,3;
2,4-dimethyl-2,4-diethylcyclobutylene-1,3;
2,2-diethyl-4,4-dimethylcyclobutylene-1,3;
2,2,4,4-tetraethylcyclobutylene-1,3;
2,2,4,4-tetra(2-ethylhexyl)cyclobutylene-1,3;
2,2-diisopropyl-4,4-dibutylcyclobutylene-1,3; and
2,2,4-trihexyl-4-methylcyclobutylene-1,3.

The preferred aromatic group containing radicals are phenylene and bis(4,4'-phenyl)isopropylidene.

The preferred homopolymers have the structures:

III 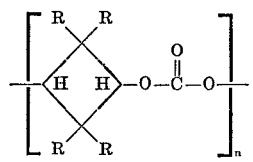

and

IV 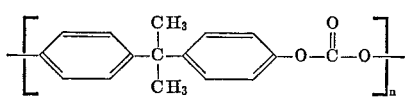

The preferred copolymers have the structures:

V 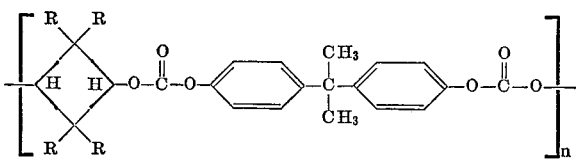

VI 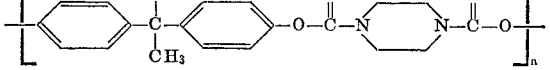

and

VII 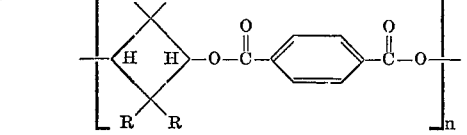

wherein such structures $n$ is as indicated above and R in each occurrence is a straight or branched chain alkyl group containing from 1 to 8, and preferably, from 1 to 2 carbon atoms.

The number of repeating units, $n$, is such as to provide resins which are solid at room temperature and which have softening points of at least about 80° C., and preferably of at least about 100° C. The most preferred of the III structure resins are those having a softening point of at least 130° C., and of the IV structure resins are those having a softening point of at least 150° C., and of the V structure resins are those having a softening point of at least 140° C., and of the VI structure resins are those having a softening point of at least 160° C. and of the VII structure resins are those having a softening point of at least 170° C.

A more detailed listing of some of the useful polycarbonate resins and processes for preparing them are disclosed in U.S. 3,161,615; U.S. 3,220,973; U.S. 3,312,659; U.S. 3,312,660; U.S. 3,313,777; Great Britain 1,011,283 and "Chemistry and Physics of Polycarbonates" by Hermann Schnell, 1964, Interscience Publishers, which disclosures are incorporated herein by reference.

The polycarbonate resins may contain adjuvant materials such as fillers, plasticizers, stabilizers, coloring agents, and the like, where such materials will generally not interfere with the utility of the desired end product. Thus, clear, liquid plasticizers or other clear liquid adjuvants, for example, could be used in transparent laminates. Where the final laminate product is to be opaque or translucent, solid or other non-transparent adjuvant materials might be employed.

The plasticizers which may be employed in the polycarbonate resins include all those which may be used for such resins, and particularly those which are included in the disclosure of U.S. 3,186,961, which disclosure also provides a process for incorporating the plasticizer in the polycarbonate resins. Such disclosure is also incorporated herein by reference.

Where the polycarbonate resin is of the type shown in structure III above, the preferred plasticizers are tricresyl phosphate, polyethylene glycol ether glyceryl monooleate, epoxidized soy bean oil, di(methyl cellosolve)succinate, di(cyclohexyl phthalate), di(butyl cellosolve) phthalate, and butyl benzyl phthalate. Other plasticizers that may be used with the structure III type polycarbonate resins include butoxy polypropylene glycol.

ADHESIVE

The adhesive which is used in preparing the laminates of the present invention is a copolymer of ethylene and vinyl acetate.

The adhesive copolymer preferably contains about 15 to 95 weight percent, and most preferably 55 to 85 weight percent, of ethylene monomer and preferably 85 to 5 weight percent, and most preferably 45 to 15 weight percent, of vinyl acetate monomer.

In addition to ethylene and vinyl acetate, the copolymers which are used as adhesives in the present invention may also contain up to about 15 weight percent of one or more other monomers which may be copolymerized with ethylene and vinyl acetate.

Such other monomers would include other vinyl monomers, i.e., those which contain the group

such as unsubstituted olefins including monoolefins such as propylene, isoprene, 1-butene, and isobutylene and polyolefins such as butadiene, 1,3-pentadiene, dicyclopentadiene and norbornene; halogenated olefins such as chloroprene, tetrafluoroethylene, chlorotrifluoroethylene, hexafluoropropylene; vinyl aryls such as styrene, o-methoxystyrene, p-methoxystyrene, m-methoxystyrene, o-nitrostyrene, p-nitrostyrene, o-methylstyrene, p-methylstyrene, m - methylstyrene, p - phenylstyrene, o - phenylstyrene, m-phenylstyrene, vinyl-naphthalene and the like; vinyl and vinylidene halides such as vinyl chloride, vinyl fluoride, vinylidene chloride, vinylidene fluoride, vinylidene bromide and the like; vinyl esters such as vinyl formate, vinyl propionate, vinyl butyrate, vinyl chloroacetate, vinyl chloropropionate, vinyl benzoate, vinyl chlorobenzoate and the like; acrylic and alpha-alkyl acrylic acids, their alkyl esters, their amides and their nitriles such as acrylic acid, chloroacrylic acid, methacrylic acid, ethacrylic acid, methyl acrylate, ethyl acrylate, butyl acrylate, n-octyl acrylate, 2-ethylhexyl acrylate, n-decyl acrylate, methyl methacrylate, butyl methacrylate, methyl ethacrylate, ethyl ethacrylate, acrylamide, N-methyl acrylamide, N,N-dimethyl acrylamide, methacrylamide, N-methyl methacrylamide, N,N-dimethyl methacrylamide, acrylonitrile, chloroacrylonitrile, methacrylonitrile, ethacrylonitrile, and the like; maleic and fumaric acid and their anhydrides and alkyl esters such as maleic anhydride, dimethyl maleate, diethyl maleate and the like; vinyl alkyl ethers and ketones such as vinyl methyl ether, vinyl ethyl ether, vinyl isobutyl ether, 2-chloroethyl vinyl ether, methyl vinyl ketone, ethyl vinyl ketone, isobutyl vinyl ketone and the like; also vinyl pyridine, N-vinyl carbazole, N-vinyl pyrrolidine, ethyl methylene malonate, acrolein, vinyl alcohol, vinyl acetal, vinyl butyral and the like; as well as non-vinyl compounds such as carbon monoxide and formaldehyde.

The copolymers which are used as adhesives in the present invention should preferably be materials which are solid at room temperature. They will also have one or more of the following physical characteristics: softening points of about 65 to 205° C., an inherent viscosity of about 0.5 to 1.5 at 30° C. in toluene as a solvent, and melt indices (ASTM D-1238-65T) of from about 0.1 dgm. per minute to about 1000 dgm. per minute or higher, with melt indices of from about 1 dgm. per minute to about 350 dgm. per minute preferred.

The copolymers can be prepared by any of the known processes provided they have the above described characteristics. One suitable manner of producing them is by the use of a catalytic amount of a free-radical catalyst employing batch, semi-continuous or continuous processes, using a stirred autoclave, a tubular reactor or the like. By the term "free-radical catalyst" is meant a catalyst which forms free radicals under the polymerization conditions employed, and includes oxygen and/or nitrogen radicals; peroxides such as hydrogen peroxide, dibenzoyl peroxide, diacetyl peroxide, ditertiarybutyl peroxide, dilauroyl peroxide, perbenzoic acid, peracetic acid, and the like; azo compounds such as azo-bisisobutyronitrile and the like.

In such process pressures of from about 5 p.s.i.g. to about 100,000 p.s.i.g. or more can be employed for the polymerization, with pressures of from about 15,000 p.s.i.g. to about 50,000 p.s.i.g. being preferred. The polymerization can be conducted at temperatures of from about 40° C. to about 400° C., with temperatures of from about 70° C. to about 225° C. being preferred.

The process may be carried out with or without diluents which may or may not be solvents for either or both of the monomers, or for the resulting copolymers.

The ethylene and the vinyl acetate, and other monomers that are to be copolymerized, can be added separately, or as a mixture, to the pressure reactor provided they are in intimate contact with the free-radical catalyst at the polymerization conditions. After completion of the polymerization, the polymer is recovered by methods known in the art.

The preferred manner of employing the copolymers of the present invention is in the form of film or sheets of about 0.0005 to 0.50 inch in thickness. The copolymer may be applied, however, to the lamina substrate surfaces in the form of a solution in an inert organic solvent. The solvent is then evaporated off and a coating of the desired thickness of the copolymer is thereby formed on the surface of the substrate. Applicable solvents are those aliphatic and aromatic hydrocarbons and their halogenated derivatives in which polyethylene generally is soluble at elevated temperatures. Examples of such solvents would include aliphatic compounds such as hexane, heptane, octane and the like; cycloaliphatic compounds such as methylcyclohexane, cyclohexane, decalin and the like; aromatic compounds such as benzene, toluene, xylene, tetralin, styrene and like; carbonyl-containing compounds such as amyl acetate, ethyl acetate, cyclohexanone, and the like; halogenated hydrocarbons such as tetrachloroethylene, 1, 1,2-trichloroethylene, carbon tetrachloride, hexachloropropane, trichlorocumene, tetrachloroethane, hexachlorobutadiene, 1,1,2-trichloroethane, 1,2-dichloroethane and the like; petroleum fractions such as petroleum ether, lubricating oil, solvent naphtha and the like, turpentine, etc. To form a film or sheet of the copolymer, the copolymer is preferably dissolved in an inert organic solvent at temperatures near, or at, the boiling point of the solvent and the resulting solution is cast out on a suitable surface, such as a flat metal surface, and the solvent is then evaporated to yield a solvent-free film or sheet.

Such solutions can contain from about 5 weight percent or less to about 80 weight percent or more of the copolymer, and from about 95 weight percent or more to about 20 weight percent or less of solvent.

Because the adhesion of the copolymer to glass is a surface phenomenon, neither the thickness of the copolymer layer nor the thickness of the glass or the polycarbonate resin laminae is of particular criticality. The thickness of the copolymer lamina is related to the temperature-use cycle for the application in question, with thicker films of the adhesive being required for the more stringent use conditions.

If desired, various adjuvants such as tints, heat stabilizers, ultra-violet light stabilizers, ultraviolet light absorbers, and/or plasticizers can be incorporated in the ethylene-vinyl acetate copolymer without impairing its adhesion to the glass or to the other laminae.

ORGANO-SILICON COMPOUNDS

In order to promote the adhesion of the various laminae to each other, it is preferable for some applications to employ certain organo-silicon compounds as adhesion promoter materials. These adhesion promoters may be used as primers and applied to the surfaces of the laminae substrates in layers which are at least monomolecular in depth. The adhesion promoters may also be incorporated or admixed in the ethylene-vinyl acetate copolymer being used as the adhesive. In the latter case, the adhesion promoter is added to the adhesive in an amount of about 0.00001 to 5.0 percent by weight based on the weight of the ethylene-vinyl acetate copolymer.

When the organo-silicon compound is to be used as a primer or incorporated into the adhesive, it may be used in the form of a solution in an organic solvent such as an alcohol, an ester, a ketone, an aromatic or aliphatic hydrocarbon, a halogenated hydrocarbon, or mixtures of such solvents.

Examples of the organo-silicon compounds which may be used include silyl peroxide compounds, alkoxy silanes, amino-alkoxy silanes, vinyl alkoxy silanes and amino-alkylalkoxy silanes.

The silyl peroxide compounds would include those having the structure:

$$R''_n Si_x (O)_y (R')_z R_a'''$$

wherein R'' is a monovalent inorganic or organic radicals, R' is a mono- or polyperoxy radical, such as ROO— and —OOR$^t$OO—, where R is hydrogen or a monovalent organic radical bonded to the peroxy oxygen by a non-carbonyl carbon atom, such as alkyl, aralkyl, cycloalkyl, aryl, cycloalkyl and the like; R$^t$ is a divalent organic radical of a dihydroperoxide of such divalent organic radical; R''' is a non-peroxy containing divalent organic radical; $n$ is 0 through 3 multiplied by $x$; $x$ is 1 to a large number; $y$ is 0 or equal to the equation $$\frac{x(4-n-z-a)}{2}$$

$z$ is at least 1 and $a$ is 0 or equal to the equation $$\frac{x(4-n-z-a)}{2}$$

Preferably, $x$ is a number typically not greater than 25, preferably, it is a number not greater than 5, and most preferably, it is equal to 1.

Illustrative of R'' are any monovalent inorganic radicals such as hydrogen, hydroxyl, alkali metal oxide (such as NaO, KO, LiO), amino, and the like, and any organic radicals such as alkyl (e.g., methyl, ethyl, pentyl, dodecyl, octadecyl, 2-ethylhexyl, and the like), cycloalkyl (such as cyclobutyl, cyclohexyl, 4-methylcyclohexyl, and the like), aryl (such as phenyl, 2-naphthyl, 2-anthracyl, biphenyl, and the like), alkaryl (such as 4-methylphenyl, 2,4-diethylphenyl, 4-dodecylphenyl, and the like), aralkyl (such as phenylethyl), alkenyl (such as vinyl, allyl, 3-butenyl, oleyl, and the like), alkadienyl (such as 1-butadienyl-1,4, 1-octadecatrienyl-9, 11,13,1-neoprenyl, and the like), cycloalkenyl (such as 3-cyclohexenyl), haloalkyl (such as chloromethyl, gamma-chloropropyl, 3,3,3-trifluoropropyl, perfluoropropyl), haloaryl (such as 4-chlorophenyl 2,4-dichlorophenyl, chloronaphthyl), halocycloalkyl (such as 4-chlorocyclohexyl), alkoxy (such as methoxy, ethoxy, propoxy, dodecyloxy, isopropoxy, and the like), aryloxy (such as phenoxy, naphthyloxy, biphenyloxy, and the like), alkylamino and arylamino (such as methylamino, diethylamino, phenylamino, and the like), and any organofunctional radical such as hydroxyalkoxy (such as beta-hydroxyethoxy, gamma-hydroxypropoxy, and the like); hydroxyalkoxyalkoxy (such as beta-hydroxyethoxyethoxy, omega - hydroxy(polyethyleneoxy) ethoxy, omega-hydroxy(poly-1,2-propyleneoxy), and the like); cyanoalkoxy (such as beta-cyanoethoxy, beta-cyanohexoxy and the like); cyanoalkoxyalkoxy (such as beta-cyanoethoxyethoxy, omega - cyanoethoxy(polyethyleneoxy), omega-cyanoethoxy(poly - 1,2 - propyleneoxy), and the like); carboxyalkoxy (such as beta-carboxyethoxy, beta-carboxyhexoxy, and the like); haloalkoxy (such as chloromethoxy, bromoethoxy, perfluoropropoxy, and the like); cyanoalkyl (such as beta-cyanoethyl, gamma-cyanopropyl, and the like); cyanoaryl (such as 4-cyanophenyl); cyanocycloalkyl (such as 4-cyanocyclohexyl, 3-cyanocyclopentyl, and the like); carboxyalkyl (such as beta-carboxyethyl, gamma-carboxypropyl, and the like); carboxyaryl (such as 4-carboxyphenyl); carboxycycloalkyl (such as 4-carboxycyclohexyl, 3-carboxycyclopentyl, and the like); isocyanatoalkyl (such as gamma-isocyanatopropyl, delta-isocyanatobutyl, and the like); isocyanatoaryl (such as 4-isocyanatophenyl); isocyanatocycloalkyl (such as 4-isocyanatocyclohexyl); alkyl or aryl carboxyalkyl (such as beta-methylcarboxyethyl, gamma-phenyl carboxypropyl, and the like); hydroxyalkyl (such as hydroxymethyl, gamma-hydroxypropyl, and the like); hydroxy(polyalkyleneoxy)alkyl (such as omega-hydroxy-(polyethyleneoxy)propyl, and the like); alkenylcarbonyloxyalkyl (such as gamma-acrylyloxypropyl, gamma-methacryloxypropyl, and the like); epoxyalkyl (such as 1,2-epoxyethyl, 1,2-epoxypropyl, 1,2-epoxybutyl, and the like); epoxy alkyloxyalkyl (such as glycidyloxypropyl); epoxycycloalkyl (such as beta-3,4-epoxycyclohexylethyl); amino aryl and aminoalkyl (such as beta-aminoethyl, gamma-aminopropyl aminomethyl, gamma-aminopropyl, delta-aminobutyl, p-aminophenyl); and the like.

Illustrative of R'' is an divalent organic radical which is joined to silicon at each free valence, such as alkylene (such as methylene, ethylene, n-hexylene, 2-ethyl-n-hexylene, and the like); arylene (such as 1,4-phenylene, 1,3-phenylene, 1,5-naphthylene, and the like); cycloalkylene (such as 1,4-cyclohexylene, 1,3-cyclohexylene, 1,3-cyclobutylene, and the like); and such divalent organic radicals as

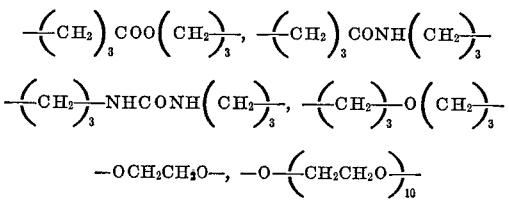

and the like.

R' may be characterized as the residue of the hydroperoxides having the formulas

ROOH and

HOOR$^t$OOH obtained by the abstraction of hydrogen from the peroxy oxygen. Illustrative of such hydroperoxides are the following:

hydrogen peroxide;
methyl hydroperoxide;
ethyl hydroperoxide;
propyl hydroperoxide;
isopropyl hydroperoxide;
n-butyl hydroperoxide;
sec-butyl hydroperoxide;
t-butyl hydroperoxide;
t-amyl hydroperoxide;
1,1-diethylpropyl hydroperoxide;
1,1,2-trimethylpropyl hydroperoxide;
1-methylhexyl hydroperoxide;
1,1,2,2-tetramethylpropyl hydroperoxide;
cyclohexyl hydroperoxide;
4-methylcyclohexyl hydroperoxide;
trans-decalin hydroperoxide (trans-decahydro-4-α-naphthyl hydroperoxide);

hexahydro-3-α-indanyl hydroperoxide;
2,5-dihydroperoxy-2,5-dimethylhexane (2,5-dimethyl-hexylidene, 2,5-dihydroperoxide);
2,7-dihydroperoxy-2,7-dimethyloctane (2,7-dimethyl-octylidene 2,7-hydroperoxide);
2-hydroperoxy-2,4-dimethyl-3-pentanone, 1,1,6,6-tetra-hydroperoxycyclodecane;
2-cyclopenten-1-yl hydroperoxide;
2-cyclohexene-1-yl hydroperoxide;
2-methyl-2-cyclohexen-1-yl hydroperoxide;
2,3-dimethyl-2-cyclohexen-1-yl hydroperoxide;
d,1-3-p-menthenyl-8-hydroperoxide;
3-methyl-3-hydroperoxy-1-butyne(1,1-dimethyl-2-propynyl hydroperoxide);
2,5-dimethyl-2,5-dihydroperoxy-3-hexyne(1,1,4,4-tetramethyl-2-butynylenedihydroperoxide);
α-methylbenzyl hydroperoxide;
cumene hydroperoxide (α,α-dimethylbenzyl hydroperoxide);
α-methyl-α-ethyl-benzyl hydroperoxide;
α-p-xylyl hydroperoxide;
diphenylmethyl hydroperoxide;
triphenylmethyl hydroperoxide;
tetralin hydroperoxide (1,2,3,4-tetrahydro-1-naphthyl hydroperoxide);
1,2,3,4-tetrahydro-1-methyl-1-naphthyl hydroperoxide;
9-fluorenyl hydroperoxide;
1-indanyl hydroperoxide;
tetrahydro-2-furfuryl hydroperoxide; and
tetrahydrocarbazole hydroperoxide (1,2,3,4-tetrahydro-4-α-H-isocarbazol-4-α-yl hydroperoxide) and
2,3-dimethyl-3-hydroperoxy butene-1.

As can be seen from the above description of the silyl peroxides compounds of this invention, they may be in the form of a monomer or polymer, e.g., silane, siloxane, or silicane, in fact any silicon-containing compound which contains an organoperoxy group bonded to silicon, which organo moiety is bonded to the peroxy oxygen and thence to the silicon by a non-carbonyl carbon atom.

These silyl peroxides can be made pursuant to the processes described in co-pending U.S. applications: Ser. Nos. 373,315; 737,316; 737,317; 737,318; 737,319; and 737,321, all filed June 17, 1968.

Specific examples of such silyl peroxide compounds are vinyl tris(t-butylperoxy)silane,
allyl tris(t-butylperoxy)silane,
tetratris(t-butylperoxy)silane,
allyl(t-butylperoxy)tetrasiloxane,
vinyl methyl bis(t-butylperoxy)silane,
vinyl tris(α,α-dimethyl benzylperoxy)silane,
allyl methyl bis(t-butylperoxy)silane,
methyl tris(t-butylperoxy)silane,
dimethyl bis(t-butylperoxy)silane,
isocyanatopropyl tris(t-butylperoxy)silane and
vinyl diacetoxy(t-butylperoxy)silane.

The amino alkyl alkoxy silanes would include those having the structure:

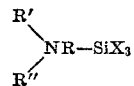

wherein X is alkoxy, aroxy or acryloxy; R is divalent alkylene of 3—8 carbon atoms with at least 3 sequential carbon atoms separating N from Si; at least one of R' and R" is hydrogen, and any remaining R' or R" is alkyl,

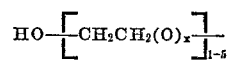

where $x$ is 0 or 1, $H_2NCO-$, $H_2NCH_2CH_2-$, and $H_2NCH_2CH_2NHCH_2CH_2-$.

Examples of such aminoalkyl-alkoxy silanes would include gamma-aminopropyltriethoxy silane,
gamma-aminopropyltrimethoxy silane,
bis(beta hydroxy methyl)gamma-aminopropyl triethoxy silane and
N-beta-(aminoethyl)gamma-aminopropyl triethoxy silane.

Other organo-silicon compounds which may be used include gamma-methacryloxypropyltrimethoxy silane, beta(3,4-epoxycyclohexyl)ethyltrimethoxy silane, gamma-glycidoxy propyl trimethoxy silane, and vinyl triethoxy silane.

In lieu of a silyl peroxide compound it is also possible to use 0.0001 to 5.0 weight percent of an organo silicon compound devoide of a peroxy group based on the total amount of the adhesive in addition to 0.001 to 5.0 weight percent of a chemical compound source of free radicals such as peroxide compounds devoid of silicon, such as benzoyl peroxide, lauryl peroxide and tert-butyl peroxide, and azo compounds such as azobisisobutyronitrile.

The organo-silicon adhesion promoters, and particularly the silyl peroxide compounds, or the silane/peroxide systems that may be used in lieu of, are preferably used for those applications where the laminate is intended to have a load bearing function, such as in the case of the structural windshields.

ABRASION RESISTANT LAMINAE

The polycarbonate resins are relatively soft materials which can be readily cut, nicked, scratched and otherwise abraded. For some applications, therefore, where a polycarbonate resin lamina of the laminates of the present invention would otherwise be subject to being abraded, it is desirable to cover the polycarbonate resin lamina with a lamina of an abrasion resistant material as shown in FIG. 3. The adhesive used to bond the abrasion resistant material lamina to the polycarbonate lamina can be the ethylene-vinyl acetate copolymer adhesive of the present invention, or any other suitable adhesive. The abrasion resistant materials are usually employed as films or sheets which are about 0.0005 to 0.050 inch thick.

The abrasion resistant material lamina can be bonded to the other laminae during the lamination of the glass laminae to the polycarbonate laminae as described above, or subsequent to such lamination.

The abrasion resistant materials are solid materials which are harder and have better scratch and abrasion resistance than the polycarbonate materials. Such materials would include polyurethane resins; metal oxides such as the oxides of chromium, aluminum, lead, silver and magnesium; silicone resins, i.e. resins having recurring

groups wherein R and R' are the same or different organic radicals; polymethyl methacrylate resins, polyesters such as polyethylene terephthalate; polyester-polyamide resins; and fluorinated hydrocarbons such as tetrafluoroethylene-hexafluoropropylene copolymers and polyvinyl fluoride resins.

APPLICATIONS

The laminates of the present invention may be used as safety glass laminates, windshields and rear, top and side windows for automobiles, trucks, and other motor vehicles, trains, airplanes and motor boats; sliding glass doors or other glass doors; bank windows and shop windows; show cases; outdoor telephone booths; outdoor lighting lenses, globes, refractors and display signs; canopies, and other enclosures such as hothouses and vending machines.

A series of examples of laminates were prepared to illustrate the present invention. These examples are merely illustrative of the present invention and are not intended as a limitation upon the scope thereof. For these examples the following polycarbonate resins were employed:

Polycarbonate resin A had a softening point of about 130° C., a reduced viscosity in chloroform at 25° C. of 1.00 and a melt flow of 4 dgm./minute and had the structure:

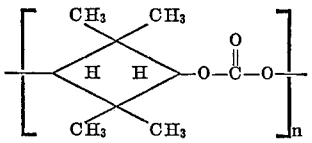

Polycarbonate resin B had a softening point of about 150° C., a reduced viscosity in chloroform at 25° C. of 0.74, and a melt flow of 1.9 dgm./minute, and had the structure IV above.

Polycarbonate resin C had a softening point of about 160° C., a reduced viscosity in chloroform at 25° C. of 0.80 and a melt flow of 4.8 dgm./minute and had the structure VI above.

EXAMPLE 1

Two 6″ x 6″ x 0.085″ panes of plate glass were bonded to a 6″ x 6″ x 0.125″ core of polycarbonate resin A by means of 0.020″ sheets of an ethylene-vinyl acetate copolymer which contained 82 weight percent of ethylene and 18 weight percent of vinyl acetate. The ethylene copolymer had an inherent viscosity in toluene at 30° C. of 0.87 and a melt index of 2.5 dgm./min. (ASTM D-1238-65T). After the laminae of glass and polycarbonate were assembled with the sheets of ethylene polymer therebetween, the assembly was bonded together in a press employing 200 lbs. per square inch of pressure at 130° C. for 30 minutes. This bonding step was followed by a cooling quench under pressure (200 p.s.i.) to reduce the temperature to about 23° C.

The resulting laminate was clear, that is, transparent, and all the laminae were bonded well at ambient temperatures. Impacting at 0° F. also revealed a high level of adhesion between the laminae with only a small amount of glass delamination occurring. Adhesion of the laminae to each other was similarly quite good at temperatures as high as 180° F. with only slight delamination developing.

EXAMPLE 2

A laminate was prepared as in Example 1 with the exception that 1 percent by weight of vinyl tris(tertiary butyl peroxy)silane was incorporated via a two-roll mill into the ethylene-vinyl acetate copolymer prior to converting the copolymer into the sheets which were used in the laminate process. The adhesion of the laminae was sufficiently improved so that no delamination occurred either at 180° F. or during impacting at 0° F.

EXAMPLE 3

A laminate was prepared as in Example 1 with the exception that the surfaces of each of the glass plates were primed with 8 drops of vinyl tris(tertiary butyl peroxy) silane prior to the lay-up of the laminae one upon the other. The adhesion of the laminae to each other was improved as in Example 2.

EXAMPLE 4

A laminate was prepared as in Example 2 except that an ethylene-vinyl acetate copolymer which contained 67 weight percent of ethylene and 33 weight percent of vinyl acetate was used as the adhesive matrix, and the first 20 minutes of the bonding cycle was accomplished at a low pressure of 2 to 3 lbs. per sq. inch and the remaining 10 minutes at 25 p.s.i. The adhesion of the laminae in the resulting laminate was outstanding as in Examples 2 and 3. The copolymer used as the adhesive had an inherent viscosity of 0.78 in toluene at 30° C. and a melt index of 25 dgm./min. (ASTM D-1238-65T).

EXAMPLE 5

Two 12″ x 12″ x 0.085″ panes of plates glass were bonded to a 12″ x 12″ x 0.125″ core of polycarbonate resin A by means of 0.005″ sheets of an ethylene-acrylic acid-vinyl acetate terpolymer which contained, respectively, 82.0/6.5/11.5 parts by weight of these monomers. The laminate was formed, after the laminate were laid-up one on top of the other, in an autoclave at a pressure of about 200 lbs. per sq. inch and at temperature of about 125° C. for about 15 minutes. The adhesion of the laminae to each other was good under ambient conditions, and even following a 0° F. impact (with a 5 lb. ball from 12 feet) a high degree of lamination persisted. The terpolymer employed as the adhesive had a melt index of 2.5 dgm./min. (ASTM D-1238-65T).

EXAMPLE 6

A laminate was prepared as in Example 2 with the exception that gamma-aminopropyltriethoxy silane was used as the silane adhesion promoter. Adhesion was comparably excellent as in Example 2.

EXAMPLE 7

A laminate was prepared as in Example 6 with the exception that polycarbonate resin B was employed as the polycarbonate resin. Adhesion was comparably excellent as in Example 6.

EXAMPLE 8

A laminate was prepared as in Example 6 with the exception that the laminate, in the form of a full-size windshield composite as shown in FIG. 4 was produced in an autoclave. The glass plates and the sheets of polycarbonate resin A measured 28 by 71 inches at their extremes and the plate glass was 0.085 inch thick and the polycarbonate resin was 0.125 inch thick. The autoclave conditions employed were a pressure of 300 p.s.i. at 130° C. for 60 minutes. The adhesion of the laminae to each other in the resulting laminate was excellent.

EXAMPLE 9

A full size windshield (26″ x 62″) was produced, as in Example 8, in which the adhesive employed was the ethylenevinyl acetate copolymer of Example 4. The copolymer had been uniformly admixed with 2.0% by weight of vinyl tris(t-butyl peroxy) silane. The thickness of the laminae were as in Example 8. The autoclave conditions were a pressure of 200 p.s.i. at 135° C. for 30 minutes. The adhesion of the laminae to each other in the resulting laminate was excellent.

EXAMPLE 10

A half windshield about (26″ x 31″) was produced, as in Example 8, in which the adhesive employed was the ethylenevinyl acetate copolymer of Example 1. The copolymer was uniformly admixed with 0.001% by weight of carbon black. The carbon black was used in order to nucleate and thereby reduce crystallinity and haze of the adhesive copolymer. An adhesion promoter was used as a primer. Prior to bonding the laminae together, the glass surfaces were primed with vinyl tris (t-butyl peroxy) silane at the rate of about 0.65 drops/in.² The autoclave conditions were a pressure of 200 p.s.i. at 275° F. for 60 minutes. The thickness of the laminae were as in Example 8. Adhesion was excellent.

EXAMPLE 11

A laminate was prepared as in Example 4 except that 2.0% by weight of vinyl triethoxy silane and 1.5% by weight of dilauryl peroxide was uniformly admixed into the adhesive. Bonding to glass was accomplished at a pressure of 3 p.s.i. for the first 3 minutes and at 100 p.s.i. for the next 25 minutes at 265° F. Adhesion of the laminae was excellent with no delamination observed at 180° F.

EXAMPLE 12

Example 4 was repeated except that polycarbonate resin C was used in place of polycarbonate resin A and the adhesive was compounded with 2% by weight of the silane adhesion promoter. The adhesion of the laminae was comparably outstanding.

EXAMPLE 13

Example 4 was repeated except that adhesive employed was copolymer which contained 60 weight percent ethylene and 40 weight percent vinyl acetate. This copolymer had an inherent viscosity of 0.70 in toluene at 30° C. and a melt index of 55 dgm./min. (ASTM D-1238-65T). Two percent by weight of the silane adhesion promoter was used. The bonding conditions were 10 minutes at 2–3 p.s.i. followed by 20 minutes at 25 p.s.i. and 265° F. Adhesion of the laminae was comparably outstanding.

EXAMPLE 14

An abrasion resistant laminate, as shown in FIG. 3, was prepared. The laminae employed measured 6" wide by 6" long. The glass lamina was 0.085" thick chemically tempered glass. The polycarbonate resin lamina was 0.090" thick polycarbonate resin A. The adhesive lamina was a 0.030" thick film of a copolymer of 60 weight percent ethylene and 40 weight percent of vinyl acetate which had a melt index of 25 dgm./minute. The adhesive contained 3 percent by weight of vinyl tris(t-butyl peroxy)silane which had been milled into the copolymer at 75° C. The abrasion resistant lamina was a 0.006" thick sheet of polymethylmethacrylate which had a reduced viscosity of about 0.70.

The laminate was prepared by assembling the laminae, as shown in FIG. 3, in an hydraulic press and subjecting the assembly to a pressure of 100 p.s.i. at 130° C. for 30 minutes. The adhesion of the laminae in the resulting laminate was excellent.

EXAMPLE 15

A laminate was prepared as in Example 14 using a 0.005" thick film of a tetrafluoroethylene-hexafluoropropylene copolymer, which had a specific gravity of 2.15, as the abrasion resistant lamina. Adhesion of the laminae was excellent.

EXAMPLE 16

A laminate was prepared as in Example 15, using, as the adhesive, a 0.020" film of a copolymer of 67 weight percent of ethylene and 33 weight percent of vinyl acetate which had a melt index or flow of 25 dgm./minute and which contained 3 percent by weight of the silyl peroxide, and, as the abrasion resistant lamina, a 0.002" thick film of polyethylene terephthalate. The adhesion of the laminae was excellent.

EXAMPLE 17

A laminate was prepared as in Example 15 except that the silyl peroxide was used as a primer. The surfaces of the polycarbonate resin lamina and the abrasion resistant material lamina which were to be bonded were primed with neat liquid silyl peroxide brushed out to give a thin film. The adhesive was a 0.020" thick film of the adhesive of Example 16. The adhesive was used between all the laminae. The adhesion of the laminae was excellent.

The term "reduced viscosity" values reported herein were computed by the use of the equation:

$$\text{Reduced viscosity} = \frac{t_s - t_0}{ct_0}$$

wherein $t_0$ is the efflux time of the solvent, $t_s$ is the efflux time of the solution of the polymer, and $c$ is the concentration of the polymer solution in terms of grams of resin per 100 grams of solvent.

The melt index flow values reported herein were measured as per ASTM test D-1238-65T.

In various embodiments of the present invention the adhesive copolymer is used, as noted above, with a chemical compound source of free radicals such as the silyl peroxides, or other compounds capable of generating free radicals when heated between about 80° C. and the decomposition point of the ethylenevinyl acetate copolymer or of any of the other components of the laminate being prepared. In a still further embodiment of the present invention the ethylene-vinyl acetate copolymer may be irradiated with a source of ionizing radiation instead of using either the silyl peroxides or other chemical compound source of free radicals. In such case the copolymer is effectively irradiated, for the purposes of the present invention, by being subjected to a source of ionizing radiation in the amount of 0.5 to 10 megareps. Such sources include electron beam and gamma radiation sources.

EXAMPLE 18

An adhesive composition was prepared by blending the copolymer of Example 3 with 2 weight percent vinyl tris(tertiarybutyl peroxy)silane as in Example 1. The adhesive mixture was then extruded in the form of a film, at 110° C. This film was then irradiated in a Van de Graaff electron accelerator which had an output of 500 watts of electron beam power. The film was exposed to an electron beam current of 2 megareps and then assembled between a layer of plate glass and a layer of polycarbonate resin A. The resulting laminate was then heated at 130° C. for one hour under a pressure of 150 p.s.i. Adhesion of the laminate was excellent. The resulting laminate is shown in FIG. 1.

The melt flow test as referred to herein with respect to the present invention differs from the standard melt index test in that the melt flow tests were run at 285° C. and the melt index tests are run at 190° C. as per ASTM D-1238-65T. The melt flow test was used for evaluating the polycarbonate resins and the melt index test was used for evaluating the adhesive copolymer.

What is claimed is:

1. A laminate of glass and polycarbonate resin bonded by adhesive which essentially consists of ethylene-vinyl acetate copolymer.

2. A laminate as in claim 1 in which a plurality of layers of glass are bonded to said resin.

3. A laminate as in claim 2 which is a structural member.

4. A laminate as in claim 3 in which said member is a windshield.

5. A laminate as in claim 1 further comprising an adhesion promoter which is an organo-silicon compound and which is used as a primer on one or more laminae in said laminate, or as an additive in said ethylene-vinyl-acetate copolymer.

6. A laminate as in claim 5 in which said organo-silicon compound is a silyl peroxide.

7. A laminate as in claim 1 in which said polycarbonate resin has a structure selected from the group consisting of I 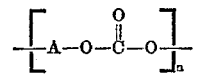

in which A is a divalent organic radical in which the terminal atoms are carbon atoms and $n$ is a whole number which is $>1$ and represents a number of recurring units, and II 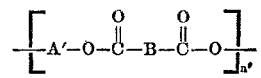

and

III 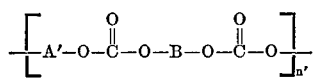

in which $n'$ is a whole number which is $>1$ and represents a number of recurring units, and A' and B are different divalent organic radicals in which the terminal atoms are carbon or nitrogen atoms in II and carbon atoms in III.

8. A laminate as in claim 1 in which said copolymer contains at least 15 weight percent of ethylene.

9. A laminate as in claim 8 in which said copolymer contains at least 5 weight percent of vinyl acetate.

10. A structural windshield which comprises two laminae of glass bonded to a core of polycarbonate resin by adhesive which essentially consists of ethylene-vinyl acetate copolymer.

11. A structural windshield as in claim 10 in which said copolymer comprises 15 to 95 weight percent of ethylene and 85 to 5 weight percent of vinyl acetate.

12. A structural windshield as in claim 10 in which said polycarbonate resin has the structure:

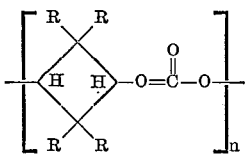

wherein R in each occurrence is a straight or branched chain alkyl group containing 1 to 8 carbon atoms and $n$ is a whole number $>1$.

13. A structural windshield as in claim 12 in which all the R's are $CH_3$.

14. A structural windshield as in claim 10 further comprising an organo-silicon adhesion promoter which is used as a primer on one or more laminae in said windsheld, or as an additive in said ethylene-vinyl acetate copolymer.

15. A structural windshield as in claim 14 in which said adhesion promoter is a silyl peroxide.

16. A process for forming a laminate which comprises laminating glass to polycarbonate resin by adhesively bonding the laminae with an adhesive which essentially consists of ethylene-vinyl acetate copolymer.

17. A laminate of glass adhesively bonded to polycarbonate resin wherein said resin has the structure

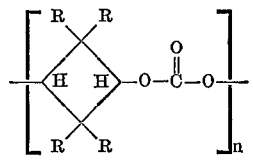

wherein R in each occurrence is a straight or branched chain alkyl group containing 1 to 8 carbon atoms and $n$ is a whole number of $>1$, and wherein the adhesive essentially consists of ethylene-vinyl acetate copolymer.

18. A laminate as in claim 1 further comprising a lamina of abrasion resistant material bonded to a lamina of polycarbonate resin, said abrasion resistant material being harder than said polycarbonte resin.

19. A laminate as in claim 1 in which the glass is tempered.

References Cited

UNITED STATES PATENTS

| | | | |
|---|---|---|---|
| 3,537,948 | 11/1970 | Marzocchi | 161—193 X |
| 3,547,766 | 12/1970 | Chu | 161—204 X |
| 3,549,476 | 12/1970 | Dietzel et al. | 161—183 X |
| 3,562,081 | 2/1971 | Stalego | 161—193 X |
| 3,573,150 | 3/1971 | Broutman et al. | 161—204 X |
| 3,488,715 | 1/1970 | Atkins | 161—204 X |
| 3,585,103 | 6/1971 | Thomson | 161—208 X |
| 2,400,139 | 5/1946 | Roland | 161—203 |
| 2,649,396 | 8/1953 | Witt et al. | 161—204 X |
| 2,774,697 | 12/1956 | Koblitz | 161—183 |
| 2,941,973 | 6/1960 | Kumnick et al. | 161—203 X |
| 2,947,718 | 8/1960 | Rugg et al. | 161—183 X |
| 3,117,046 | 1/1964 | Klockgether | 161—183 X |
| 3,157,563 | 11/1964 | Baum | 161—204 |
| 3,388,033 | 6/1968 | Buckley et al. | 161—183 |
| 3,420,679 | 1/1969 | Gifford et al. | 161—183 X |
| 3,520,768 | 7/1970 | Peilstocker et al. | 161—183 X |
| 3,532,590 | 10/1970 | Priddle | 161—195 X |

FOREIGN PATENTS 1,367,646  6/1964  France.

HAROLD ANSHER, Primary Examiner

U.S. Cl. X.R.

161—193, 204